Figure 1:
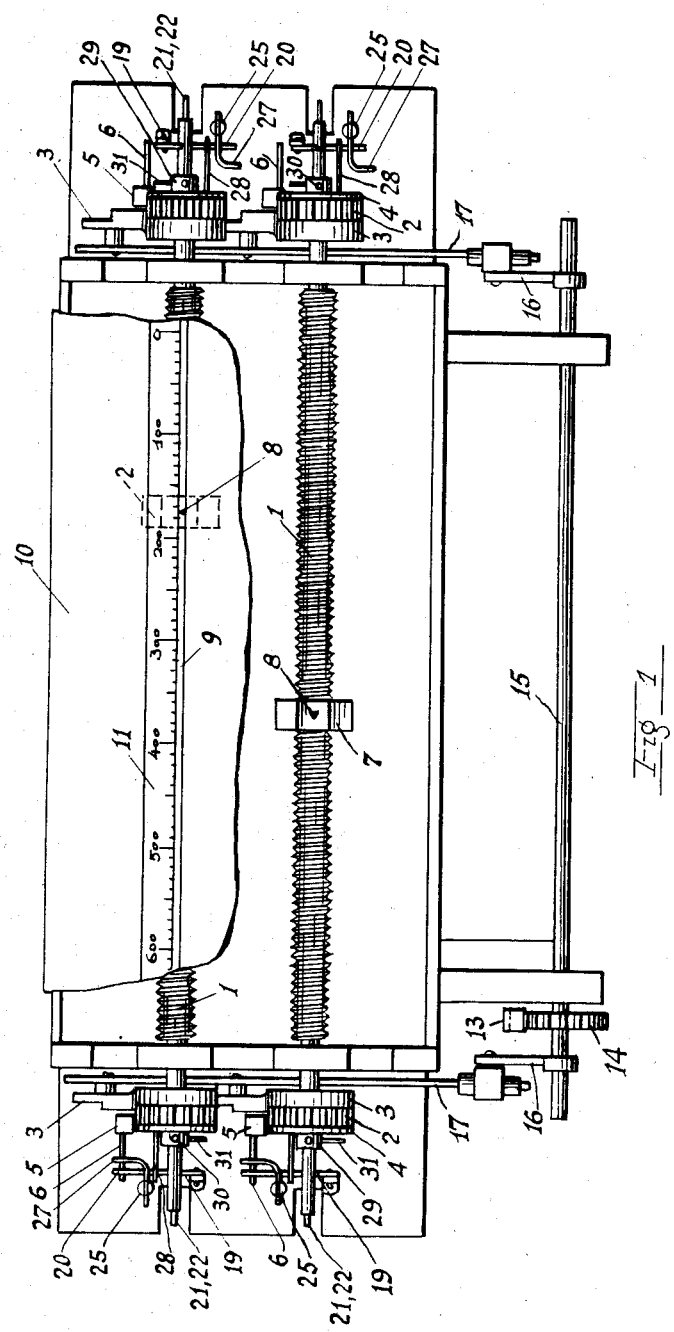

Patented Apr. 18, 1939

2,154,962

UNITED STATES PATENT OFFICE 2,154,962

DEVICE INTENDED PREFERABLY TO INDICATE THE IMMEDIATE CONTENTS IN CONTAINERS

Bernt Skaraas and Erik Danielsson, Stavanger, Norway

Application November 25, 1936, Serial No. 112,694
In Norway April 11, 1936

7 Claims. (Cl. 116—114)

The invention relates to a device for indicating the contents in containers at any time, and constitutes an improvement and simplification of the device described in Patent No. 2,056,490, in which is described a device utilizing the oscillation of automatic weighing cars, when weighing in or out on a container (silo container), for the purpose of giving, by mechanical or electro-magnetic means, one of the members of the device a movement, which movement is transmitted by mechanical means to rotatable indicator shafts provided with sliding members (screw nuts), which are connected with a pointer in such a manner as to give the shaft a certain rotary movement and the sliding member of the shaft a certain longitudinal movement along the shaft, which movement is indicated by the pointer on a reading scale, the indicator shaft being put into action by means of special coupling members when weighing in or out on the corresponding container. According to the said patent, two rotatable shafts are provided for each container, one of the shafts being threaded and fitted with a toothed wheel and the other being smooth and furnished with a longitudinal groove, in which another toothed wheel engages and along which the wheel can be moved, the toothed wheels of the shaft being in engagement and constrainedly interconnected so that they are forced to move up and down together when one of the shafts is rotating. By means of this arrangement, one of the shafts rotates when weighing in on the container, whilst the other shaft rotates when weighing out.

According to the present invention, the weighing cars operate the device through electro-magnetic means; the weighing cars, when moved, close an electric circuit, thereby energising an electro-magnet, and the actuating member of the latter causes the movement of one of the parts of the device. The device is characterised by oscillating (motor-driven) pendulums which are each fitted with a preferably rotatable pawl or the like. On the circuit of the electro-magnet being closed by the weighing car when weighing in or out on a particular container, a pawl is automatically moved into engagement with a ratchet wheel, mounted on the indicator shaft, and the latter is thereby caused, owing to the swinging of the pendulum, to rotate. The said actuating member of the electro-magnet actuates a release mechanism, which operates a coupling mechanism which itself causes the pawl to engage the ratchet wheel. The said release and coupling mechanisms are automatically returned to their normal inoperative position by suitable means during the rotation of the indicator shaft.

It will be understood that, as the same weight, for example 500 kgs. is always used in the case of each weighing-in on a container, and the same weight, for example 100 kgs. is also always used in the case of each weighing-out, the indicator will not only count the number of loads weighed in or out but will also indicate the weight of the contents of a container at any given time.

Thus, assuming 500 kgs. are weighed in, then the pointer will move in one direction over the scale to a position corresponding to this amount; if now 100 kgs. are weighed out, the pointer will move back over the scale in the other direction a distance corresponding to this amount, that is to say a fifth of the distance over which it moved on weighing-in. The final position of the pointer will clearly indicate the final content of the container. The mechanism is, of course, so arranged that the indicator shaft is rotated a correspondingly greater number of times for each weighing-in than for each weighing out of a container.

The device will be explained in detail with reference to the accompanying drawings, which show a device for indicating the contents in two containers, the device having one single indicator shaft for each container.

Figure 2:
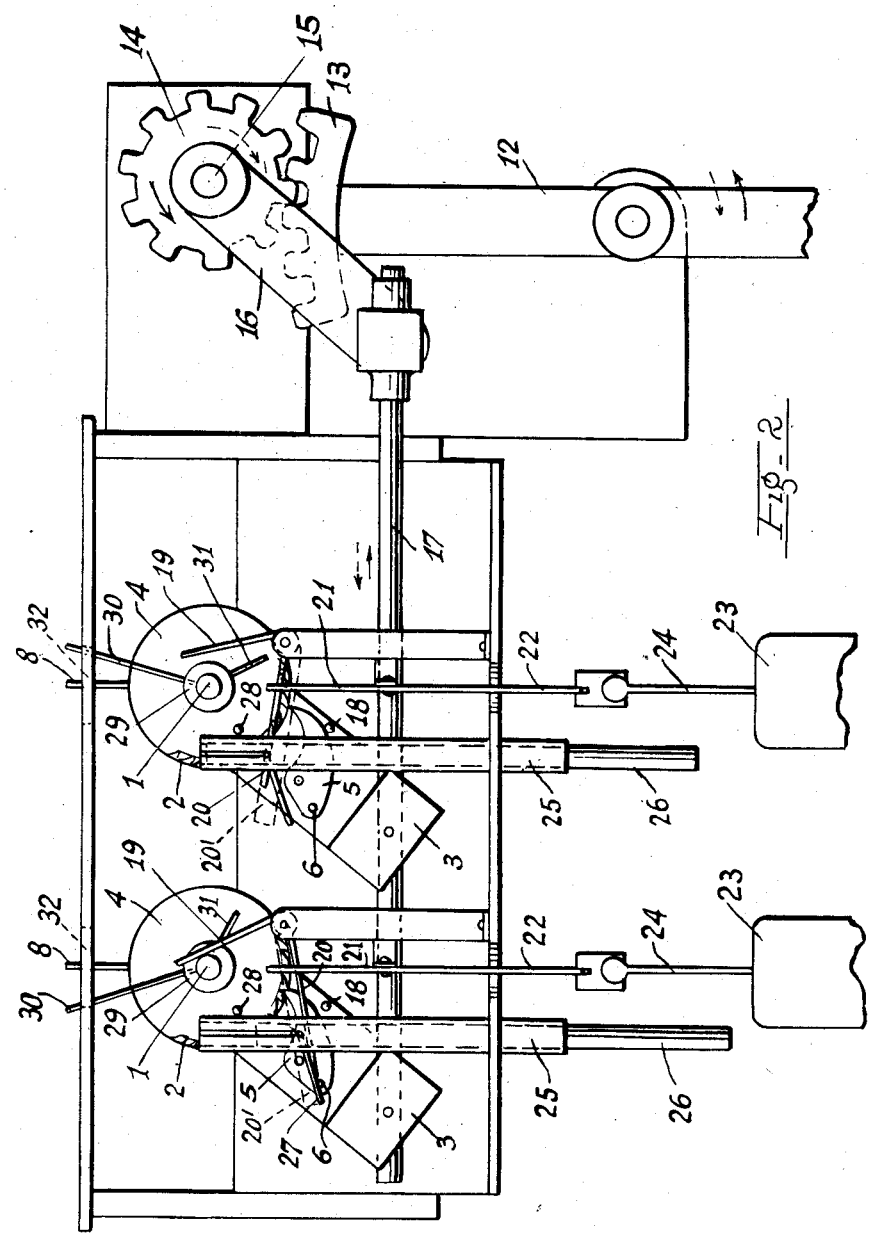
Figure 3:
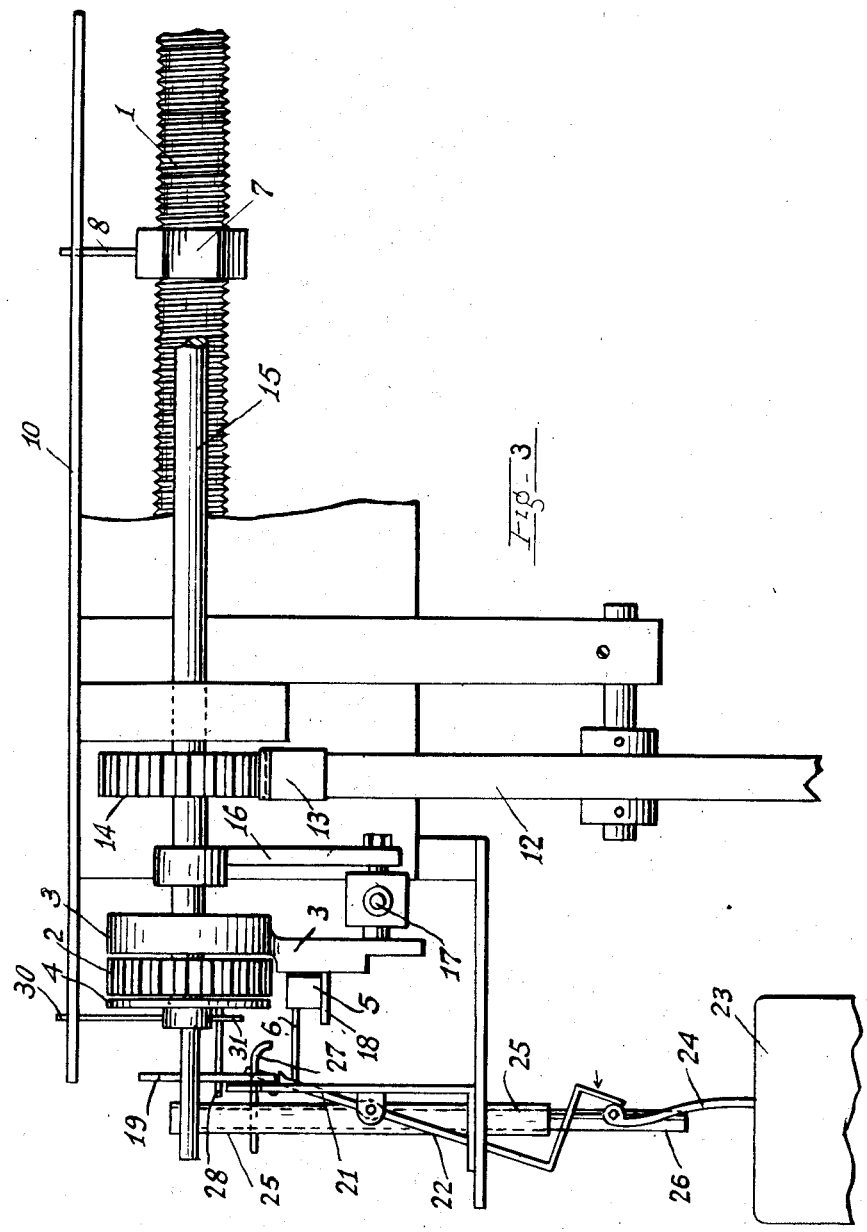

Fig. 1 represents a top view of the device,

Fig. 2 gives an end view, and in Fig. 3 one half of the device is shown in side view.

The shafts 1 are fitted with ratchet wheels 2 and movable wheels 4 provided with teeth corresponding to those of the ratchet wheels 2. On the shafts 1 are suspended pendulum members 3 carrying pivoted pawls 5, which are provided with a projecting knob or pin 6. Shaft 1 bears a screw nut 7 provided with a pointer 8 projecting up through a slit 9 in the cover plate 10, on which a reading scale 11 is mounted along the slit. The screw nut will therefore not revolve on the shaft, but will move along the shaft on rotation of the same. The pendulums 3 are continuously oscillated by means of a motor, which operates the lever 12 which is provided at its upper end with a toothed segment 13, engaging a toothed wheel 14 on a shaft 15. The shaft 15 carries a bar 16, which is pivotally connected to the rod 17 which actuates the pendulums 3. Normally, the pawl 5 rests on a projection 18 and has no effect on the indicator shaft 1. In front of the pendulum 3 is mounted a pivoted lever 19, 20, which is normally kept in its uppermost position by another lever 21, 22 directly acted upon by the actuating member 24 of the electro-magnet 23 when the circuit of the electro-magnet is closed by the movement of the weighing cars.

Further, the coupling member 26, consisting of a rod vertically movable in a sleeve 25 and fitted with an arm 27 or the like, is normally kept in an upper inoperative position by the lever 19, 20.

When, upon the circuit being closed through the movement of the weighing cars when weighing in or out on a container, the actuating member 24 of the electro-magnet is deflected and swings the lever 21, 22, the lever 19, 20 will also be thrown out of balance and swing down to the left, and the coupling member 26 will thus descend into its operative position. Upon swinging of the pendulum 3, the projecting pin 6 of the pawl hits the arm 27 and forces the pawl 5 to engage the ratchet wheel 2. The pendulum 3 and the indicator shaft 1 are now coupled, and on the pendulum swinging back again, the shaft will be rotated in one direction or the other, depending upon whether the pendulums 3 on the left or on the right side of the shaft are being operated, i. e. depending on whether a weighing in or a weighing out of a container is taking place whereby the screw nut 7 will slide correspondingly along the reading scale. In Fig. 2 is shown an example of a weighing in operation on one of the containers, and, therefore, the pawl of the left side is in engagement with the ratchet wheel.

When, owing to the swinging of the pendulum, the pawl 5 has rotated the shaft 1, and the pendulum swings back again, the pawl by its own weight drops down again onto the projection 18, whereby the pendulum and the shaft again become disengaged.

At the same time as the pawl, owing to the swinging of the pendulum, causes the shaft 1 to rotate, it will also revolve the conveying member or wheel 4, and, simultaneously, a projecting bar 28 attached to the said wheel will swing the lever 19, 20 back into its uppermost position, where it is held by the lever 21, 22. Simultaneously, the lever 19, 20 lifts the coupling member 26 into its upper rest position, so as to prevent the projecting pin 6 of the pawl 5 from reaching the arm 27 during the swinging of the pendulum 3.

During weighing in, the shaft 1 is caused to rotate from the left side, (Fig. 1) and, when weighing out, from the right side, in opposite directions, the pawl 5 and the ratchet wheel 2 in this case acting reversely. It will be easily understood that it is possible simultaneously to weigh in and out on the same container, because the pawls 5 at the ends of the shaft will in that case act oppositely to one another with the result that when the pendulum 3 oscillates in one direction, the shaft will be rotated in one direction and, when the pendulum returns, the shaft will be rotated in the opposite direction.

Moreover, the shaft 1 is fitted with a movable wheel 29 provided with arms 30, 31. When the wheel 4 is rotated, its projecting bar 28 will cause the arms 30, 31 of the movable wheel 29 to swing towards one side, where they will remain, and the position of the arm 30 in the slit 32 of the cover plate 10 will then immediately indicate whether a weighing-in or a weighing-out on a particular container has taken place.

The manner of action of the device may be briefly summed up as follows:—

When weighing in on a container, the weighing car closes an electric circuit thereby energising the electro-magnet 23 appertaining to the container in question, whereby the actuating member 24 of the said electro-magnet is deflected and the device is acted upon in the above described manner, to cause the shaft 1 to rotate through the mechanism arranged on the left-hand end thereof—Fig. 1. The screw nut 7 will slide to the left, and the pointer 8 will indicate, on the indicator scale 11, the increased contents in the container. The pendulum 3 is then automatically disengaged from the shaft 1. On its return swing, similarly, on weighing-out on a container, the same series of operations will take place except that the shaft appertaining to the particular container being used will rotate in the opposite direction, from the right by the mechanism disposed at the right hand end of Fig. 1 and the screw nut 7 and its pointer will slide along the scale towards the right, thereby indicating the reduced contents in the container in question.

We claim:

1. In a device of the kind referred to and having a rotatable indicator shaft carried by a support and a ratchet wheel mounted on said shaft, the combination of: a swingable pivot member; a pawl carried by said pivot member and said pawl being associated with said ratchet wheel; a two-armed lever pivoted to said support; a pivoted lever carried by said support adjacent said pawl, said lever being normally held in an inoperative position by said two-armed lever; and means for moving said two-armed lever so as to release said pivoted lever to cause said pawl to engage said ratchet wheel, during swinging of said pawl pivot in one direction so as to rotate said indicator shaft.

2. In a device of the kind referred to and having a rotatable indicator shaft carried by a support and a ratchet wheel mounted on said shaft, the combination of: a swingable pivot member; a pawl carried by said pivot member, said pawl being associated with said ratchet wheel; a two-armed lever pivoted to said support; a pivoted lever carried by said support adjacent said pawl, said lever being operable by said two-armed lever; a coupling member operable by said pivoted lever to cause said pawl to engage the said ratchet wheel to rotate said shaft; and means for actuating said two-armed lever.

3. In a device of the kind referred to and having a rotatable indicator shaft carried by a support and a ratchet wheel mounted on said shaft, the combination of: a swingable pivot member; a pawl carried by said pivot member, and said pawl being associated with said ratchet wheel; a two-armed lever pivoted to said support; a pivoted lever carried by said support adjacent said pawl, said lever being operable by said two-armed lever; a coupling member operable by said pivoted lever to move said pawl into engagement with said ratchet wheel to rotate said shaft; means for actuating said two-armed lever; and means for returning said pivoted lever and coupling member to their initial positions.

4. In a device of the kind referred to and having a rotatable indicator shaft carried by a support and a ratchet wheel mounted on said shaft, the combination of: a swingable pivot member; a pawl carried by said pivot member, and said pawl being associated with said ratchet-wheel; a pivoted lever carried by said support adjacent said pawl, said lever being operable to cause said pawl to engage the said ratchet wheel to rotate said shaft; means for actuating said lever; a wheel disposed adjacent to and rotatable with said ratchet wheel; and a pin on said wheel adapted on rotation of said wheel to contact with said pivoted lever and return same to its initial position.

5. In a device of the kind referred to and having a rotatable indicator shaft carried by a support and a ratchet wheel mounted on said shaft, the combination of: a swingable pivot member; a pawl carried by said pivot member and said pawl being associated with said ratchet wheel; means for continuously swinging said pivot member; a two-armed lever pivoted to said support; means for actuating said two-armed lever; a pivoted lever carried by said support adjacent said pawl, said lever being operable by said two-armed lever; a vertically arranged sleeve; a rod slidable in said sleeve, said rod being normally retained by said pivoted lever in inoperative position; and a projection on said rod adapted, on movement of said rod on actuation of said pivoted lever, to enter the path of movement of said pawl to cause the latter, during swinging of said pivot member in one direction to engage said ratchet wheel to rotate said shaft and actuate said indicating device.

6. In a device of the kind referred to and having a rotatable indicator shaft carried by a support and a ratchet wheel mounted on said shaft, the combination of: a swingable pivot member; a pawl carried by said pivot member, and said pawl being associated with said ratchet wheel; a two-armed lever pivoted to said support; a pivoted lever carried by said support adjacent said pawl, said lever being operable by said two-armed lever; a coupling member operable by said pivoted lever to move said pawl into engagement with said ratchet wheel to rotate said shaft; means for actuating said two-armed lever; means for returning said pivoted lever to its initial position; and means operable by said returning means for directly indicating that a rotation of said shaft has taken place.

7. In a device of the kind referred to and having a rotatable indicator shaft carried by a support and a ratchet wheel mounted on said shaft, the combination of: a swingable pivot member; a pawl carried by said pivot member, said pawl being associated with said ratchet wheel; a pivoted lever carried by said support adjacent said pawl; an actuating member for said lever; means for operating said actuating member to cause said pawl to engage said ratchet wheel to rotate said shaft during the swinging of said pivot member; means for returning said lever to its initial position; and an indicator arm adapted to be displaced out of its normal position by said returning means for directly indicating that a rotation of the shaft has taken place.

BERNT SKARAAS.
ERIK DANIELSSON.